US008894226B2

(12) United States Patent
Hicks et al.

(10) Patent No.: US 8,894,226 B2
(45) Date of Patent: Nov. 25, 2014

(54) TWO MIRROR SYSTEM (75) Inventors: Robert Andrew Hicks, Philadelphia, PA (US); Christopher Croke, Narberth, PA (US)

(73) Assignees: Drexel University, Philadelphia, PA (US); The Trustees of The University of Pennsylvania, Philadelphia, PA (US)

( * ) Notice: Subject to any disclaimer, the term of this patent is extended or adjusted under 35 U.S.C. 154(b) by 244 days.

(21) Appl. No.: 13/639,441

(22) PCT Filed: Apr. 14, 2011

(86) PCT No.: PCT/US2011/032534
§ 371 (c)(1),
(2), (4) Date: Oct. 4, 2012

(87) PCT Pub. No.: WO2011/133400
PCT Pub. Date: Oct. 27, 2011

(65) Prior Publication Data
US 2013/0170057 A1 Jul. 4, 2013

Related U.S. Application Data (60) Provisional application No. 61/325,602, filed on Apr. 19, 2010.

(51) Int. Cl.
G02B 5/08 (2006.01)
G02B 7/182 (2006.01)
G02B 5/10 (2006.01)
G02B 27/00 (2006.01)
G02B 17/06 (2006.01)

(52) U.S. Cl.
CPC .............. *G02B 5/10* (2013.01); *G02B 17/0621* (2013.01); *G02B 27/0012* (2013.01)
USPC ............ 359/846; 359/850; 359/858; 359/862

(58) Field of Classification Search
None
See application file for complete search history.

(56) References Cited

U.S. PATENT DOCUMENTS

| 2,878,721 | A | 3/1959 | Kanolt |
| 6,654,516 | B2 | 11/2003 | So |
| 6,836,381 | B2 | 12/2004 | Giles et al. |
| 7,321,465 | B2 | 1/2008 | Totzeck et al. |
| 7,460,985 | B2 * | 12/2008 | Benitez et al. ............... 703/2 |
| 2005/0086032 | A1 | 4/2005 | Benitez et al. |
| 2008/0165415 | A1 | 7/2008 | Chan et al. |

OTHER PUBLICATIONS

Oliker, V., "Optical design of freeform two-mirror beam-shaping systems" vol. 24, No. 12, pp. 3741-3752, 2007/J. Opt. Soc. Am. A.
Oliker, V., "On design of free-form refractive beam shapers, sensitivity to figure error, and convexity of lenses", vol. 25, No. 12, Dec. 2008, J. Opt. Soc. Am. A.
Hicks, R. A., et al., "Designing coupled free-form surfaces" JOSA A, vol. 27, Issue 10, pp. 2132-2137 (2010).

* cited by examiner

*Primary Examiner* — Jade R Chwasz
(74) *Attorney, Agent, or Firm* — Mendelsohn, Drucker and Dunleavy, P.C.

(57) ABSTRACT

A method for producing a multiple surface system that may be a two-mirror surface. The method involves first finding from a given primary curve an appropriate secondary curve. The method then uses ideas from exterior differential systems to grow from the primary curve and the secondary curve, primary and secondary mirror surfaces. The Cartan-Kähler theorem gives a strong indication of the existence of such solution surfaces.

19 Claims, 11 Drawing Sheets

TWO MIRROR SYSTEM

This invention was reduced to practice with Government support under Grant No. DMS 0908299 awarded by the National Science Foundation; the Government is therefore entitled to certain rights to this invention.

BACKGROUND OF THE INVENTION

1. Field of the Invention

The present invention is directed towards optical systems. In particular the present invention is directed towards a method of designing an optical system consisting of two reflecting surfaces and other optical systems consisting of multiple surface, reflecting or refracting designed by the method.

2. Description of the Related Technology

Designing optical systems that use free-form surfaces is challenging, even when designing a system that uses only a single surface. Free-form surfaces are natural choices for optical systems that lack symmetry. By "free-form" it is meant that the surface is not required to conform to a fixed class of shapes, i.e. it need not be rotationally symmetric and may have a plurality of non-symmetrical undulations. An early example of a free-form surface is a progressive lens (C. W. Kanolt. Multifocal Opthalmic Lenses. U.S. Pat. No. 2,878,721, Mar. 24, 1959.), such as those used in corrective lenses. Another example that uses free-form surfaces is the Polaroid SX-70 camera. Until recently, the grinding of free-form surfaces was extremely difficult, but now with technology developed by the DARPA conformal optics program, techniques, such as raster grinding are commercially available.

Free-form surfaces can play a role in numerous applications that by their nature lack rotational symmetry, but methods for the design of free-form surfaces are in their infancy. Illumination is a natural application area. However, for illumination, even the problem of controlling the intensity from a single point source with a single reflector is quite challenging.

The design of multiple free-form surface systems is considerably more complicated than that of single surface free-form systems. A coupled pair of free-form lenses has been considered in shaping laser beams. Two reflector systems for illumination have also been investigated. Examples include work by Oliker "On design of free-form refractive beam shapers, sensitivity to figure error, and convexity of lenses", Vol. 25, No. 12, December 2008, J. Opt. Soc. Am. A.

Figure 1:
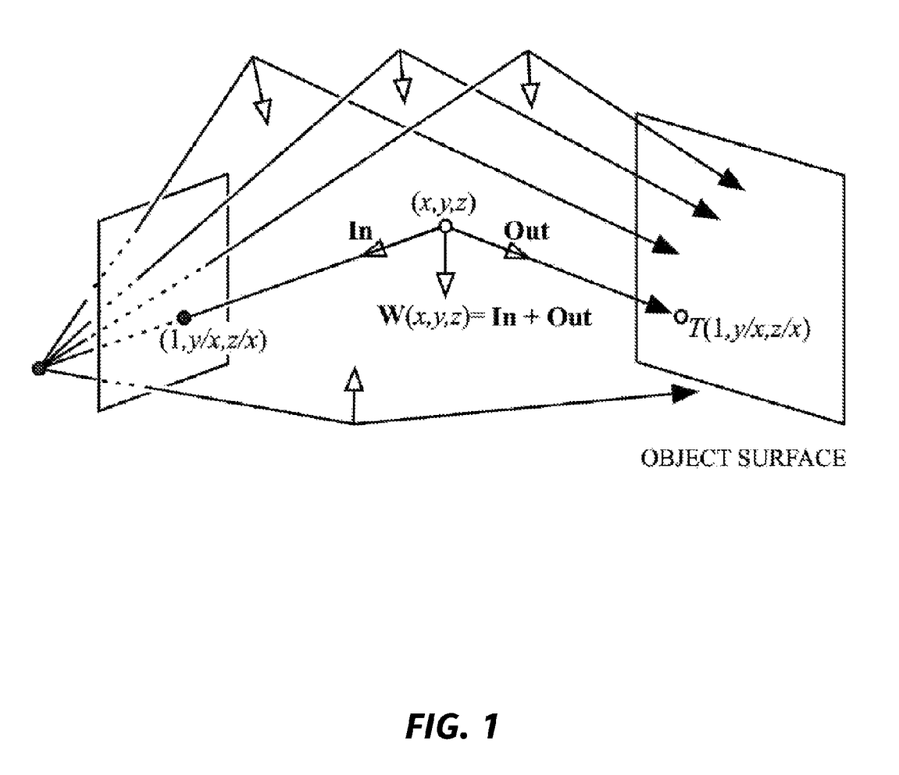
FIG. 1 is a diagram showing the potential solution set for a free-form surface problem.

Additionally, the problem of finding a mirror that induced a prescribed projection has been considered. In solving this problem it is assumed that a pinhole camera views a mirror. This case is unusual, in that the pinhole is considered as a single source from which rays emanate via the reversibility of geometric optics. In solving this problem, a surface S is to be imaged onto a plane I in a prescribed way. A mapping of T: I→S is part of the data of the problem. This is shown in FIG. 1, where given a correspondence, T, that points from an image plane to points on a target surface, one can attempt to define a vector field W that is normal to a mirror surface that realizes the correspondence. The mapping corresponds to controlling the distortion of the mirror. Given such a correspondence, a vector field W is then defined on some subset of $R^3$ via the construction given in FIG. 1. If a solution M exists then W will be perpendicular to it.

The length of W is irrelevant, it is only important that each tangent plane TpM of M be orthogonal to W. This gives rise to a planar distribution, i.e. an assignment of a plane, Ep, to each point p in the domain of interest, in which M is an integral surface of that distribution. That is to say the tangent planes of M coincide with the planes of the distribution.

It is unlikely, but if $\nabla \times W=0$ then $W=\nabla \phi$ for some $\phi$ and the level surfaces $\phi(x,y,z)=C$ are each a solution to the problem. In cases such as this, where an open set is foliated by solution surfaces, the distribution is said to integrable. It may be that W is not a gradient, but a multiple of a gradient, which occurs if $(\nabla \times W) \cdot W=0$. This is the vector calculus version of a statement in terms of differential forms: if $\theta$ is the 1-form dual to W, then the distribution is integrable in an open set if $\theta \wedge d\theta=0$ in that set.

While some work with free-form surfaces has been pursued, there has not been a system and method that has been able to accurately design a two mirror system that is able to use free-form surfaces.

SUMMARY OF THE INVENTION

An object of the present invention may be a multiple surface system.

Another object of the present invention may be a method for producing a multiple surface system.

Still yet another object of the present invention may be a multiple free-form mirror system.

An aspect of the invention may be a method for producing a multiple surface system comprising: generating a primary curve; determining from the primary curve a secondary curve based on the primary curve so that the resulting secondary curve is a Cauchy curve in six dimensions that is Kähler regular; progressively determining a primary surface and a secondary surface based on the primary curve and the secondary curve; and producing the primary surface and the secondary surface.

Another aspect of the invention may be a two-mirror system produced by a method comprising: generating a primary curve; determining a secondary curve based on the primary curve so that the resulting Cauchy curve in six dimensions is Kähler regular; progressively determining a primary mirror surface and a secondary mirror surface based on the primary curve and the secondary curve; and producing the primary mirror surface and the secondary mirror surface.

Still yet another aspect of the invention may be a method for producing a multiple mirror system comprising generating a primary curve; determining from the primary curve a secondary curve using exterior differential systems; progressively determining a primary mirror surface and a secondary mirror surface based on the primary curve and the secondary curve; and producing the primary mirror surface and the secondary mirror surface.

These and various other advantages and features of novelty that characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

The present invention sets forth a method for the coupled design of two free-form reflective surfaces, which have a prescribed distortion. The method and system utilizes the language of distributions from differential geometry and exterior differential systems. The results from numerical experiments using this method are set forth below.

The differential form corresponding to the vector field (P, Q, R) is Pdx+Qdy+Rdz and likewise in higher dimensions. The meaning of dθ is discussed below.

The wedge product ∧ is the hodge dual of a cross product in a three dimensional scenario. In higher dimensions, such as six, the wedge product ∧ is a generalization. In this method differential one forms are objects which act on tangent vectors, yielding a number. A solution surface to a system of one forms is a surface for which every one form in the system when acting on any tangent vector to the surface yields zero.

A differential form θ=Pdx+Qdy+Rdz acts on tangent vector in $R^3$ in the following way. Given a point p and a vector v based at p, then $$\theta(v)=(P(p),Q(p),R(p))\cdot v \quad (1)$$

As discussed with respect to FIG. 1, given a correspondence, T, points from an image plane to points on a target surface, a vector field W is defined that is should be normal to a mirror surface that realizes the correspondence. Even if a surface normal to W does not exist, approximate answers that are optically interesting may be computed. An example method would be to try and find a function φ whose gradient is close to being parallel to W.

There is a link between the single surface problem and exterior differential systems (EDS). For example, consider an over-determined system of partial differential equations of the type:

$$\partial z/\partial x = A(x,y,z) \quad (2)$$

$$\partial z/\partial y = B(x,y,z) \quad (3)$$

To see that this system is really the same as the single surface problem considered above, observe that in the single surface problem one seeks a surface whose tangent space is perpendicular to a given vector at each point. This is the same as prescribing the partial derivatives of the graph of a surface at each point, which is what the above system consists of. This system has a solution surface that is an integral surface of the 1-form:

$$\theta = dz - A(x,y,z)dx - B(x,y,z)dy \quad (4)$$

In other words, a surface will be a solution if this form annihilates tangent vectors to the surface. Since mixed partials must commute, there is a hidden relation, from the chain rule, that must be satisfied:

$$\partial A/\partial y+(\partial A/\partial z)(\partial z/\partial y)=\partial B/\partial x+(\partial B/\partial z)(\partial z/\partial x) \quad (5)$$

or $$A_y+A_zB=B_x+B_zA. \quad (6)$$

Thus if A and B satisfy this, a solution will exist. This relation is the same as the test discussed above. In the language of differential forms, this amounts to the statement that:

$$\theta \wedge d\theta = 0 \quad (7)$$

If ω is the 1-form corresponding to the above-defined vector field W, a necessary condition for the existence of perpendicular surfaces to W is that ω ∧ dω.

For more complex systems of equations, all of the hidden relations should be found. This can be accomplished by use of a theorem/algorithm that is one of the main tools of exterior differential systems (EDS), known as the Cartan-Kähler theorem, which (in the analytic case) when given the differential forms corresponding to the equations, gives an algorithm for checking whether an integral manifold of a given dimension, through a given point, exists.

To solve this, the machinery of differential forms is used. These forms are defined on a differentiable manifold M, which will often be subsets of n-dimensional Euclidean space $R^n$. A k-dimensional distribution, E, on M (or a subset of $R^n$), is a smooth assignment of a k-dimensional subspace, Ep of the n-dimensional tangent space to each point p of M. In terms of classical mechanics, a distribution is a means to describe a constraint on the phase space of a mechanical system, i.e. a non-holonomic constraint, as opposed to a constraint on the configuration space.

A non-holonomic system is a system of particles which is subjected to constraints of such a nature that the system cannot be described by independent coordinates; examples are a rolling hoop, or an ice skate which must point along its path. The case of a unicycle on a plane is such an example.

Figure 2:
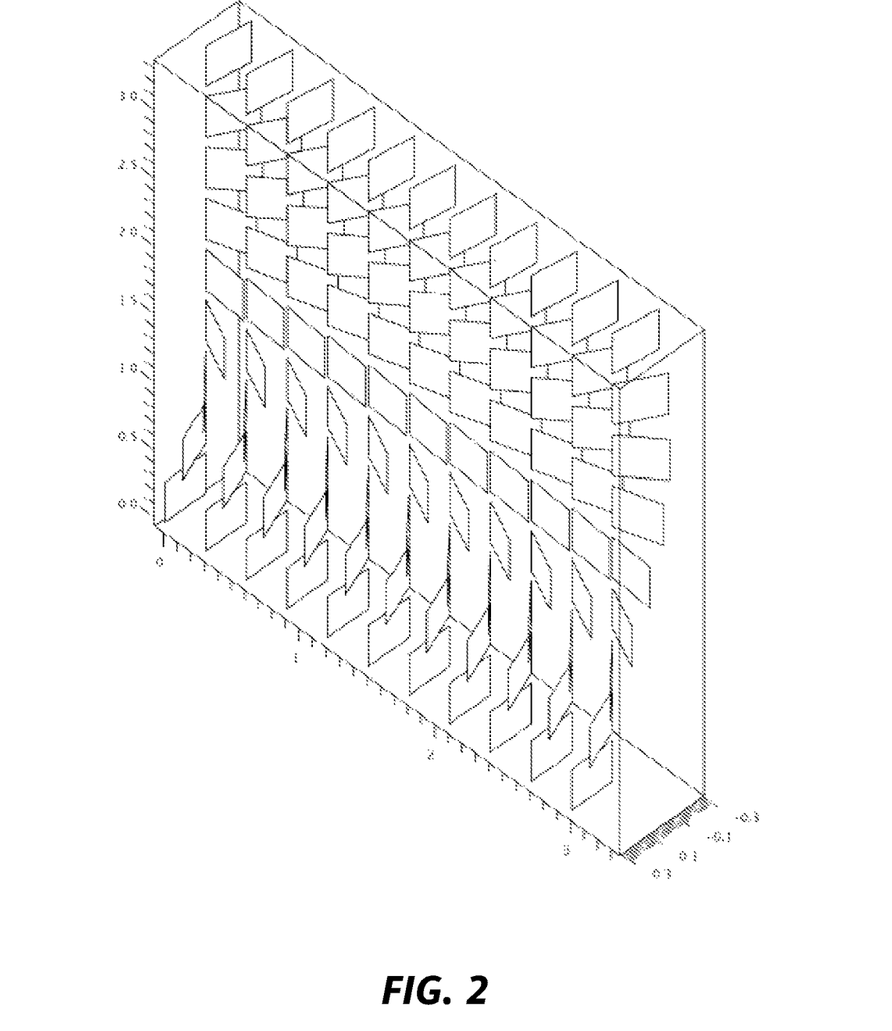
FIG. 2 is a diagram showing a depiction of the phase space of a unicycle.

FIG. 2 is a diagram showing a depiction of the phase space of a unicycle. The x-y plane is extended by a θ axis, which is the orientation of the unicycle. If the unicycle is at (x, y, θ) its velocities are constrained to be in a plane. Here a grid of sample points has been chosen in the plane x=0 and squares plotted about each point to represent the plane that constrains the velocities if the unicycle is in the state represented by the center of the square.

While all possible configurations are possible, i.e. positions and orientations of the unicycle, in a given position, not all possible velocities are possible for the unicycle. If one uses the configuration space for this problem it consists of points of the form (x, y, cos(θ), sin(θ)), where (x, y) is the point where the unicycle touches the plane, and θ is the angle it makes with the x axis. At each (x, y) the space of possible velocities is a two dimensional plane in the three dimensional configuration space of points (x, y, cos(θ), sin(θ)).

One degree of freedom comes from rotating the unicycle above the point (x, y), i.e. only changing theta. The other degree of freedom comes from the unicycle being allowed to move in the cos(θ), sin(θ) direction. If one is willing to sacrifice a small bit of precision, the configuration space can be viewed as the set of points $(x, y, \theta)$, i.e., $R^3$, and it is easy to draw the planes at each point that the velocities are constrained to.

An integral of a distribution is a submanifold N whose tangent spaces lie in the distribution, i.e. $TpN \subset Ep$ for each $p \epsilon N$. Roughly, the use of EDS is to express the system of partial differential equations as a collection of differential forms I in order to take advantage of the theory associated with differential forms. An advantage of this is that the algebraic machinery associated with the forms can give existence to information for the original partial differential equations (PDEs).

The Cartan-Kähler theorem gives conditions for when, given a k-dimensional, real analytic, integral of I, P, there will exist a unique, connected, (k+1)-dimensional, real analytic integral, X of I that satisfies $P \subset X$. In general, there is an extensive theory of EDS for numerous algorithms, some of which have been used in the past. While EDS is largely concerned with existence, and has little numerical theory associated with it, EDS does in fact yield a numerical scheme for the two mirror problem.

The applications of the present invention occur in open subsets of $R^n$ and so it is convenient to describe E by giving one or more vector fields that are perpendicular to E. In the language of differential forms, E is the kernel of a collection of forms. In the design of a single surface, the differential form is the operator that takes the dot product of a tangent vector $v_p$ at a point p with W(p), i.e. the subspace is the plane perpendicular to W(p).

As shown above, most single surface design problems modeled as a planar distribution in $R^3$ will not have a solution surface that integrates them. However if two surfaces are employed exact answers are possible. For example, the problem of eliminating blind-spots for automobiles is approximately solvable in the case of the driver side, but attempts to solve the problem of finding a wide-angle passenger-side mirror by approximate integration have not been successful. Attempts using the above described techniques tend to generate solutions that are close in shape to spherical mirrors, which are in fact what many trucks and buses use. By applying the EDS method the problem may be solved with a pair of mirrors. While such a solution may be too bulky for use on a car, it may find applications on larger vehicles, where the blind spot problem is much more severe.

Figure 3:
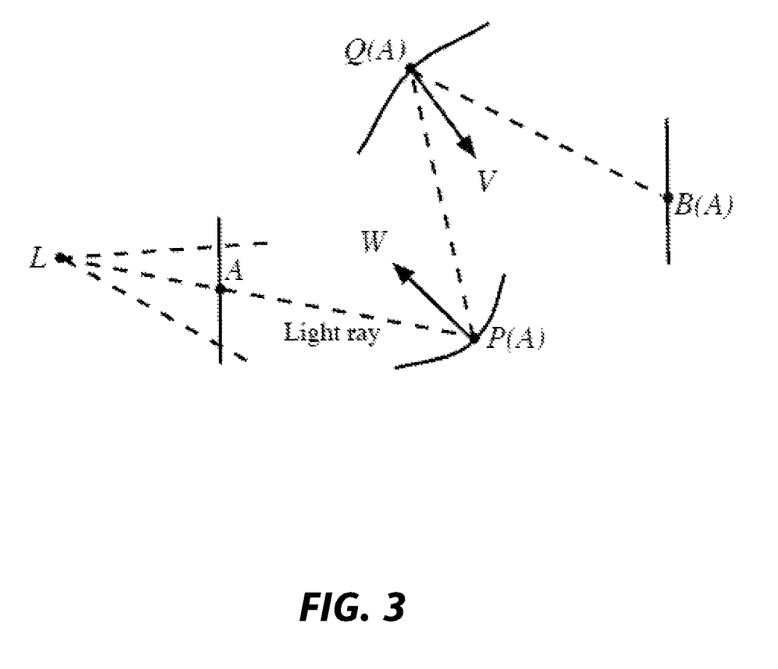
FIG. 3 is a diagram depicting a two-mirror system for controlling a ray bundle emanating from a single source, L.

The multiple surface case may be modeled with a system of partial differential equations, which can easily be viewed as an EDS. In building a two mirror system the correspondence of B between the plane x=0 and the plane x=1 is taken. The rays are considered to be emanating from a source L to the left of the plane x=0, or entering a pinhole. In FIG. 3, a ray traveling through a point A=(0, s, t) travels to point B(s, t) by reflecting off of two mirrors at the points P(A) and Q(A). One natural example is B(s, t)=($\alpha$s, $\alpha$t). This is the transformation used for wide angle imaging. This requirement determines a pair of normals, W and V, at P(A) and Q(A). Therefore two mirrors are needed, parameterized as:

$$P:(s,t) \rightarrow (x(s,t), y(s,t), z(s,t)), \quad (8)$$

and, $$Q:(s,t) \rightarrow (u(s,t), v(s,t), w(s,t)) \quad (9)$$

To ensure that the light ray reflects from P(A) to Q(A) to B(A) the tangent vectors to the above surfaces need to be perpendicular to the normals W and V. P is the graph of a surface, e.g. take x(s, t)=s, y(s, t)=t, which is only a minor restriction for the problem. This gives a system of four partial differential equations in four unknowns:

$$P_s(s,t) \cdot W(s,t) = 0, P_t(s,t) \cdot W(s,t) = 0 \quad (10)$$

$$Q_s(s,t) \cdot V(s,t) = 0, Q_t(s,t) \cdot V(s,t) = 0 \quad (11)$$

W and V are computed by finding the unit directions from various points and adding them. For example:

$$V = (P(s,t) - Q(s,t))/|P(s,t) - Q(s,t)| + (B(s,t) - Q(s,t))/|B(s,t) - Q(s,t)| \quad (12)$$

Hence W and V depend (algebraically as long as B is algebraic) on only x, y, z, u, v and w, and so this system is quasi-linear.

To phrase the problem in terms of differential forms, the "lifted" vector fields in six dimensions are considered.

$$W = (W1, W2, W3, 0, 0, 0), \quad (13)$$

$$V = (0, 0, 0, V1, V2, V3) \quad (14)$$

A single surface is sought for, which is parameterize as below.

$$\Gamma:(s,t) \rightarrow (x(s,t), y(s,t), z(s,t), u(s,t), v(s,t), w(s,t)) \quad (15)$$

This single surface is sought so that the tangent vectors to $\Gamma$ are always perpendicular to W and V, i.e.:

$$\Gamma_s \cdot W = 0, \Gamma_s \cdot W = 0, \quad (16)$$

$$\Gamma_t \cdot V = 0, \Gamma_s \cdot V = 0 \quad (17)$$

Dual to W and V are one forms $\theta_1$ and $\theta_2$ which have a common kernel that is a four-dimensional distribution in $R^6$, to which the 2D integral surface, $\Gamma$ is sought.

Note that equations (16) and (17) have four unknown functions (since we take x(s,t)=s and y(s,t)=t) of two variables, and hence eight first partial derivatives. To construct a solution surface using finite difference methods for example, the values of all eight derivatives at a given point are sought, but only four equations are given. Using differential forms, additional equations must hold that provide this information. Namely, it must be the case that $d\theta_1$ and $d\theta_2$ must also vanish on the tangent bundle of any solution. This is formalized below.

E is considered a 4-distribution on a 6-manifold M, which is the kernel of a pair of 1-forms, $\theta_1$ and $\theta_2$. A nonzero vector v in Ep is Kähler-regular if the set of 4 linear equations:

$$\theta_1(w) = \theta_2(w) = d\theta_1(v, w) = d\theta_2(v, w) = 0 \quad (18)$$

for w in TpM has maximum rank, four, which would result in a two-dimensional solution. These four equations determine a unique tangent space to a solution surface at p, if v is given. Similarly, an immersed curve C in M is Kähler-regular if its tangent vectors are Kähler-regular at each point of C. In particular, such a curve C is a 1D integral of the distribution E. In this case, the Cartan-Kähler theorem states that if E is real-analytic and C is a real-analytic, then with the Kähler-regular integral curve of E, C will lie in a locally unique real analytic 2D integral surface of E. Thus, if the initial data is tangent to the distribution, then a solution surface will exist that contains it. Accordingly, given a 4-distribution E on a 6-manifold, the generic vector v in Ep (for p a generic point in M) is Kähler-regular. Thus, for most 4-distributions, the existence and uniqueness of 2D integral surfaces is expected.

In the above example of multiple surface design, $\theta_1$ and $\theta_2$ are taken to be the forms in an open subset of $R^6$ that are dual to the vector fields W and V. In the problems usually addressed by the present invention, all of the quantities are real analytic, and in fact often algebraic. Equation (18) then suggests a method of numerically constructing a solution.

Figure 4:
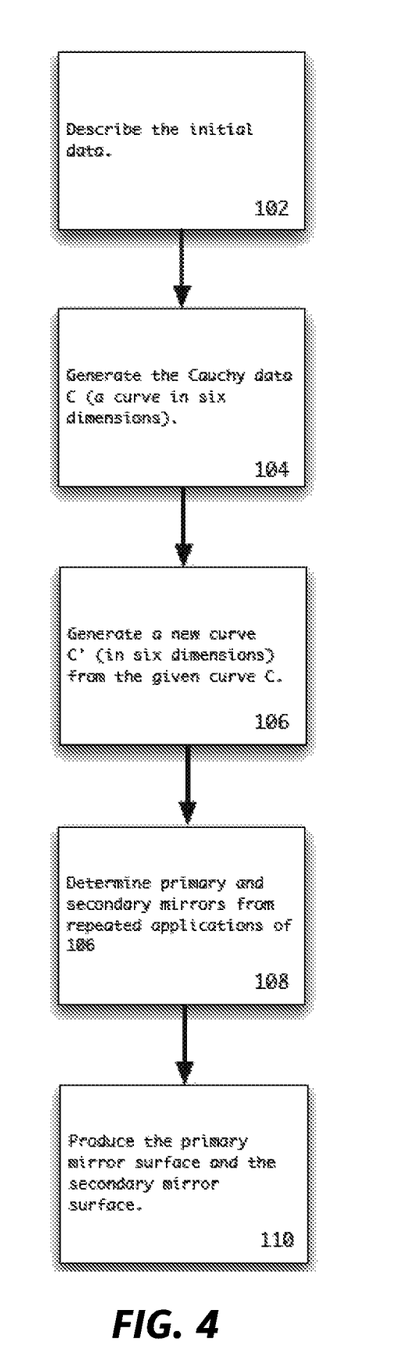
FIG. 4 is a flow chart depicting a method of making the multiple surfaces.

FIG. 4 shows a flow chart depicting the method of making multiple surfaces. In the first step 102, the initial data for the problem may be given. This data may then be used in generating the initial primary curve as well as initial conditions for the initial secondary curve. The data and the resulting curves are initially determined based upon the environmental circumstances in which the surfaces will be employed and the desired result.

In step 104, the Cauchy curve C is generated. The Cauchy data is a curve C in six dimensions, which is everywhere tangent to Ep which is represented by a pair of curves in three space (the primary and the secondary curves). This is accomplished by solving an under-constrained differential equation, i.e., every distribution has many 1-dimensional integrals. C must be discretized as a finite (ordered) collection of points in $R^6$. At each of these points, the tangent space of the solution surface is computed by using the equations (18). Preferably the Cauchy curve C is Kähler-regular.

Figure 5:
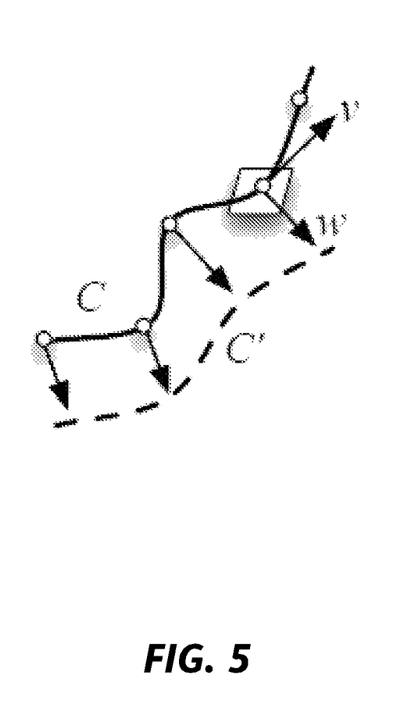
FIG. 5 illustrates a numerical method for generating a solution surface from an initial Kähler regular curve.

In step 106, the curve C is used to generate a new curve on the surface C'. This is graphically illustrated in FIG. 5, one "pushes off", i.e. computes a w at each p, to form a new discretized curve, C'. Since C' is also a curve in six dimensional space it consists of two curves in three space,—a primary and a secondary curve. This pushing off may be done in an infinite number of directions. For example, v and w may be chosen to be perpendicular.

In step 108, the primary surface 10 and the secondary surface 20 are progressively determined by iterating the process in step 106 generating a curve C'' from C' as C' was determined from C (Note that each of these curves describe both a primary and a secondary curve.) The primary surface 10 and the secondary surface 20 are "grown" from the primary curve and the secondary curves of C and then those of C' etc. The resultant surfaces may be free-form in shape. The design shapes may be expressed in an electronic format, such as on a computer readable media or in a memory device that may then be utilized in the construction of the surfaces.

In step 110, the primary surface 10 and the secondary surface 20 are physically constructed. This may be done using techniques such as raster grinding, which are commercially available.

Figure 6:
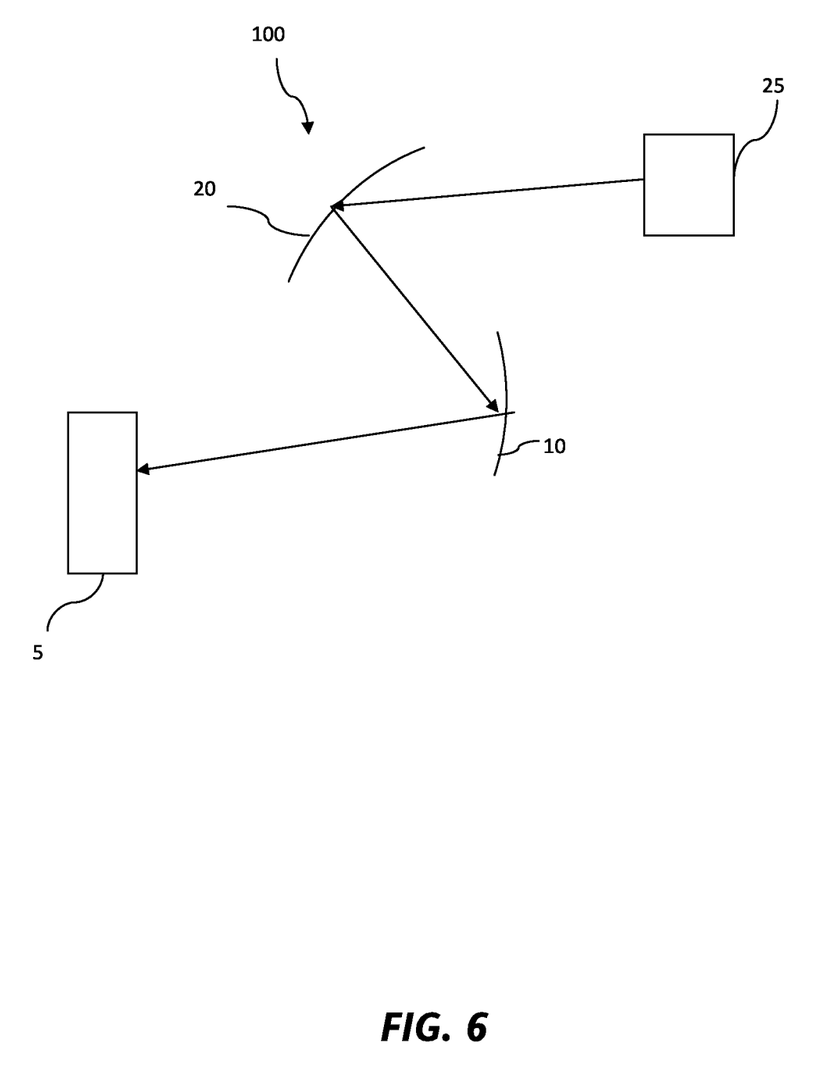
FIG. 6 is a diagram depicting a multiple surface system.
Figure 9:
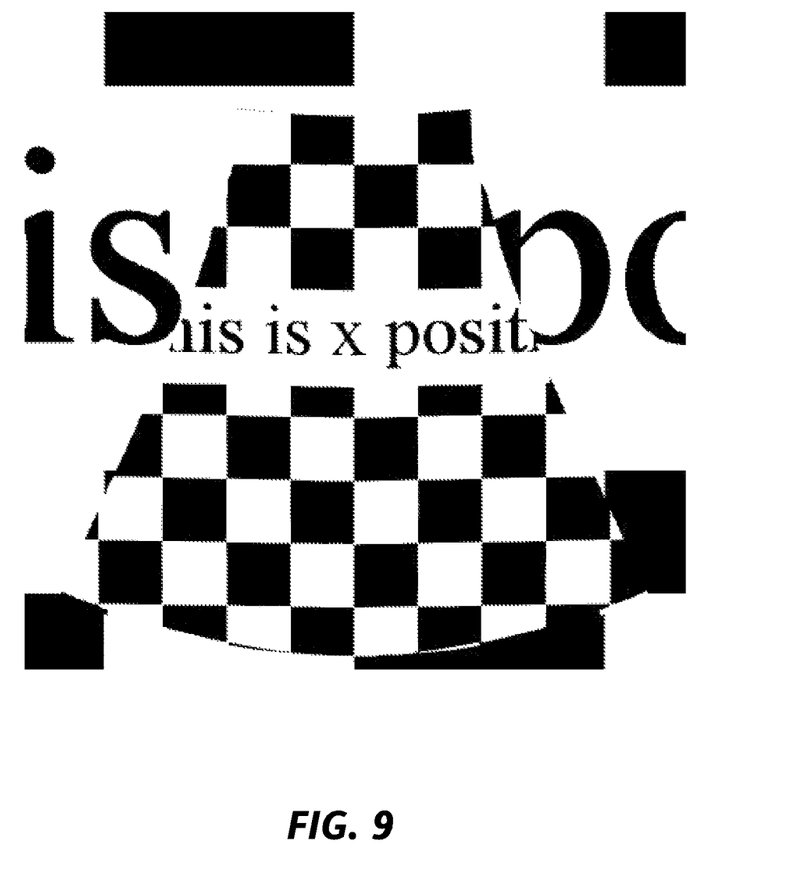
FIG. 9 shows a ray tracing simulation of the mirror pair wherein the wall is visible beyond the lower mirror, which presents a wide-angle view of the wall.

FIG. 6 shows a diagram of a multiple surface system 100 created by the method discussed above. In the multiple surface system 100 shown in FIG. 6, a primary surface 10 and a secondary surface 20 are shown, both of which are free-form mirrors. The method shown in FIG. 4 was applied to the problem of designing a multiple surface system 100 that produced two mirrors, which resulted in a forward looking wide-angle result. Thus, an observer 5 with a narrow field of view would look at a primary surface 10, which is a mirror, and see what lay beyond it in the secondary surface 20, which is also a mirror. In FIG. 9, a simulation of an observer's view of the primary surface 10 is shown. Here, the secondary mirror 20 is elevated and is not visible by the observer 5. In the distance is a checkerboard target surface 25.

A numerical example of a design for the multiple surface system 100 discussed above is addressed below.

The observer 5 is considered a pinhole of a camera at the origin and is to view a primary surface 10, which is a mirror that is on the x-axis and exhibits symmetry about the x-z plane, as will the secondary surface 20, which is also a mirror. The transformation T is then:

$$(0,0,0,1000,4000(X2/X1),4000(X3/X1)) \quad (19)$$

Where X=(X1, X2, X3, X4, X5, X6), the target surface 25 is the plane X4=1000 and the scale factor has been chosen to be 4000 (i.e. an effective visual factor of 4). In a sense, this example is a form of wide-angle periscope.

The first step is to compute the initial Cauchy data for the problem which is a curve C(t) in six dimensions. Thus C(t)= (CP(t),CS(t)) where CP (the primary) and CS (the secondary) are curves in three space. There is a great deal of freedom in doing this. In the example of the wide angle periscope advantage is taken of having symmetry of the primary surface 10 and the secondary surface 20 is to compute a solution that has projections into $R^2$ that will be a pair of curves in the x-z plane. Additionally, it is assumed that the "bottom", or primary curve CP(t) is given, and from it the "upper", or secondary curve CS(t) is computed. Given this, if the primary curve CP is of the form t→(t, γ(t)), then the secondary curve CS may be parametrized using the rays that reflect off of the primary curve C. At the point (t, γ(t)) the ray to the origin is—(t, γ(t)), which is calculated to reflect off of the normal to the curve, (−γ'(t),1), which gives an outgoing ray with direction:

$$\theta(t)=(\theta_1(t),\theta_2(t))=(-2(t(dt\gamma(t)-\gamma(t))dt\gamma(t))/(1+dt\gamma(t)2))+t,2((td/dt\gamma(t)-\gamma(t))/(1+(dt\gamma(t))^2+\gamma(t)) \quad (20)$$

A function β(t) is sought for such that the curve in six dimensions:

$$C(t)=(t,0,\gamma(t),t+\beta(t)\theta_1,0,\gamma(t)+\beta(t)\theta_2) \quad (21)$$

is perpendicular to the two vector fields W and V. In this example γ(t)=t−5. The equation:

$$W(C(t))\cdot C'(t)=0 \quad (22)$$

involves no derivatives of β, and is in fact a functional equation for β, not a differential equation.

This equation is automatically satisfied but is not needed though, since the primary curve C has been chosen, and the second equation:

$$V(C(t))\cdot C'(t)=0 \quad (23)$$

is a differential equation for β. 8≤t≤10 and the initial condition for β to be β(8)=1 gives an initial condition:

$$C(8)=(8,0,-1,7,0,7) \quad (24)$$

Figure 7:
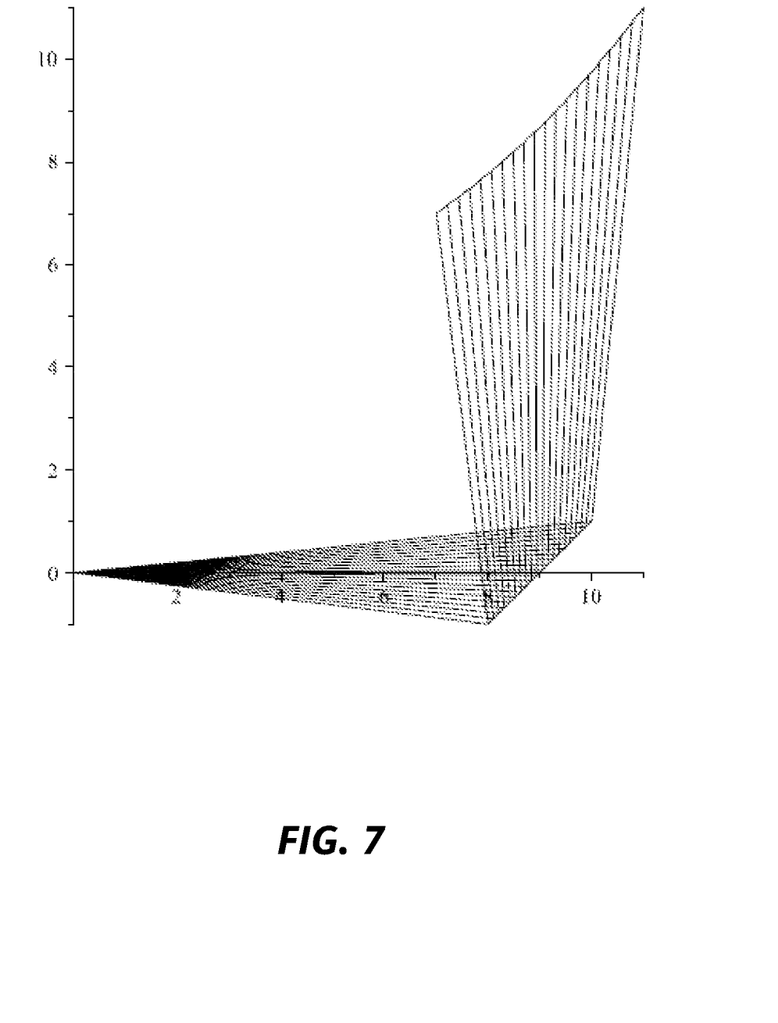
FIG. 7 is a graphical depiction of the initial Cauchy data (which consists of the primary curve and a secondary curve), with some sample rays traced.

Solving equation (23) with this initial condition gives the curve pair depicted in FIG. 7.

Figure 8:
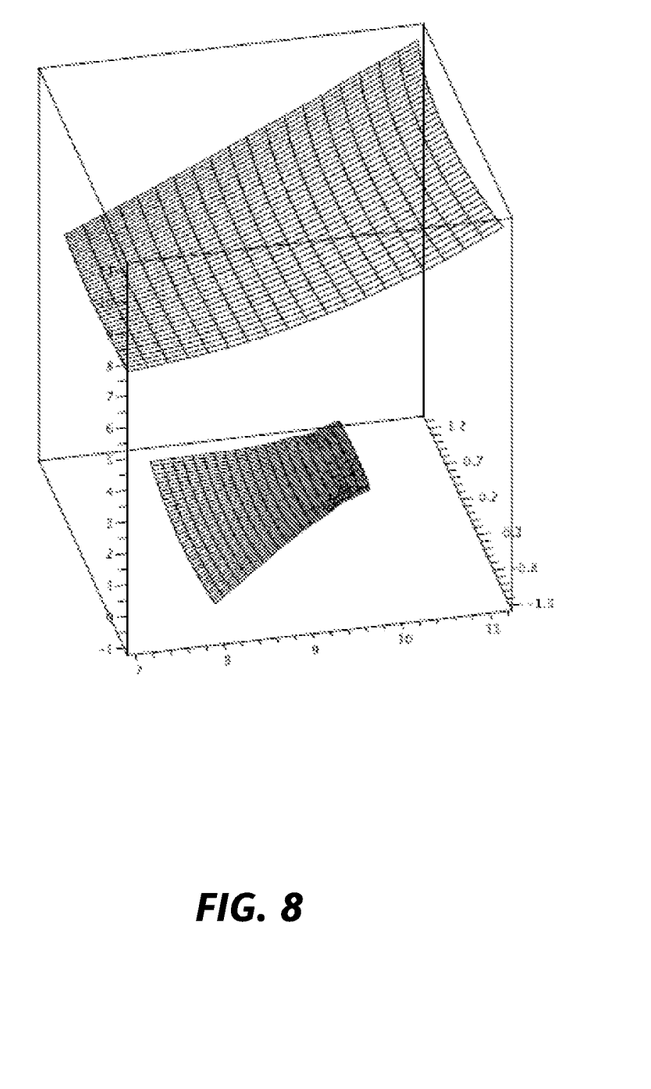
FIG. 8 shows the multiple surfaces generated from the Cauchy initial data depicted in FIG. 7.

It turns out that the choice of C(t) is unstable, as the system appears to have rank three, which is not maximal, on C(t), i.e. C(t) is not Kähler-regular. To remedy this it is taken that:

$$C(t)=(t,10^{-7},\gamma(t),t+\beta(t)\theta_1,0,\gamma(t)+\beta(t)\theta_2) \quad (25)$$

which gives the surfaces depicted in FIG. 8.

Figure 10:
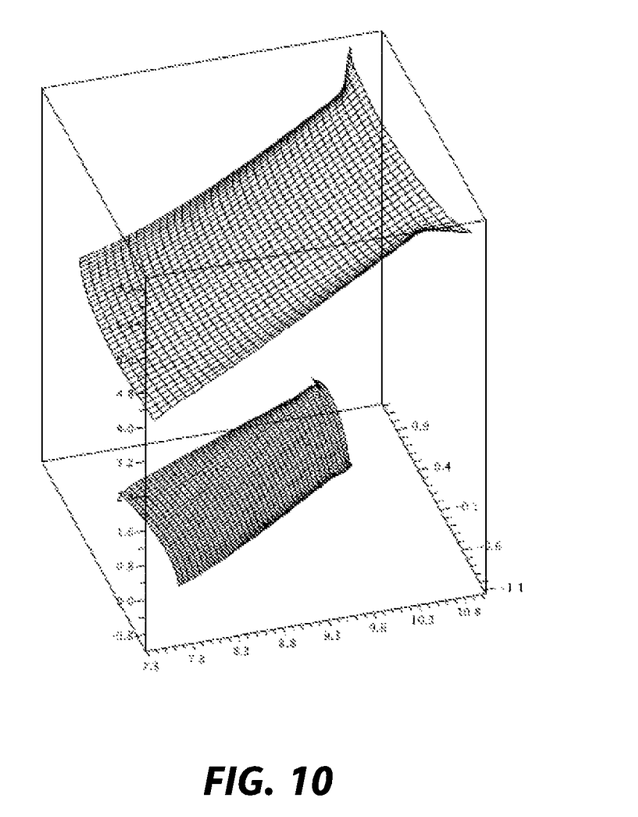
FIG. 10 shows another example of multiple surfaces generated by use of a Kähler curve.
Figure 11:
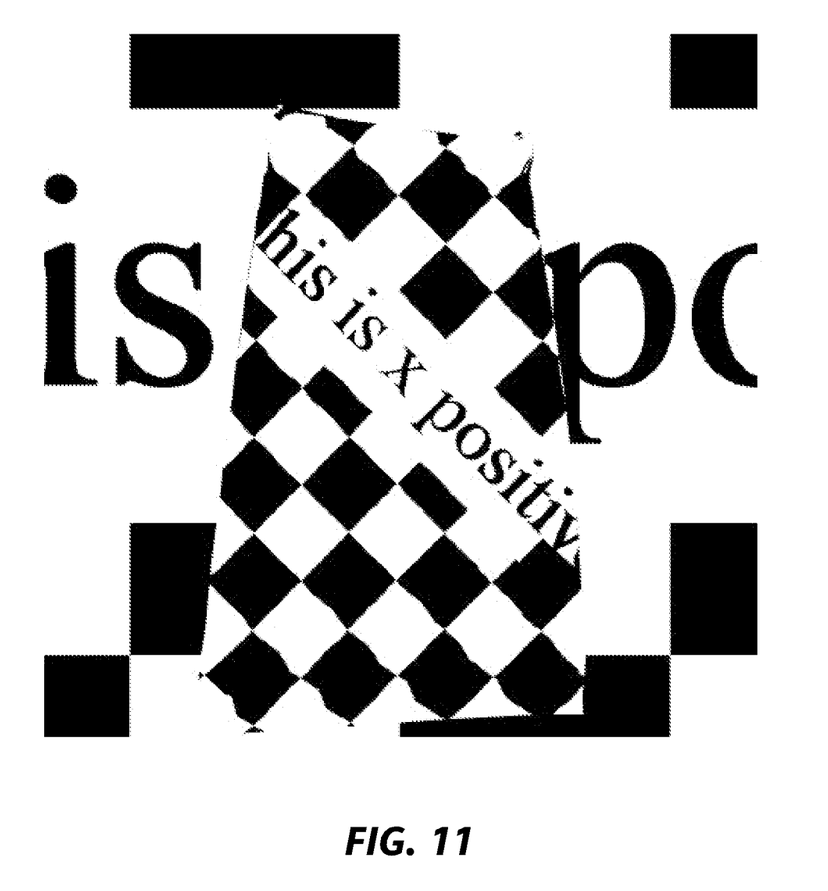
FIG. 11 shows the ray tracing simulation of the mirror pair formed using the surfaces depicted in FIG. 10, wherein the wall is visible beyond the lower mirror, which presents a wide-angle view of the wall.

The ray tracing simulation appears in FIG. 9. Here the primary surface 10 is viewed from the origin, i.e. observer 5, in a cubical room with side length 2000. Thus the target surface 5 is 1000 units away, and is covered with red and black checkers, and some text denoting that the x-axis intersects it. FIG. 10 shows another example of multiple surfaces generated by use of this method. FIG. 11 shows the ray tracing simulation of the mirror pair formed using the surfaces depicted in FIG. 10, wherein the target surface is visible beyond the lower mirror, which presents a wide-angle view of the wall and a rotation by 45 degrees.

Applications for the two-mirror system 100 may be for a periscope, driver side mirror, and applications associated with lenses, such as corrective lenses, projection televisions and short throw projections. The two-mirror system 100 may also be used to spread out a beam of light.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A method for producing a multiple surface system comprising:
   generating a primary curve;
   determining from the primary curve a secondary curve based on the primary curve so that the resulting secondary curve is a Cauchy curve in six dimensions that is Kähler regular;
   progressively determining a primary surface and a secondary surface based on the primary curve and the secondary curve; and
   producing the primary surface and the secondary surface.

2. The method of claim 1, wherein determining the secondary curve from the primary curve is accomplished via application of methods from exterior differential systems.

3. The method of claim 1, wherein the primary surface is free-form.

4. The method of claim 1, wherein the secondary surface is free-form.

5. The method of claim 1, wherein the primary surface and the secondary surface are free-form.

6. The method of claim 1, wherein the primary surface is a mirror.

7. The method of claim 1, wherein the secondary surface is a mirror.

8. The method of claim 1, wherein the primary surface and the secondary surface are mirrors.

9. A two-mirror system produced by a method comprising:
   generating a primary curve;
   determining a secondary curve based on the primary curve so that the resulting Cauchy curve in six dimensions is Kähler regular;
   progressively determining a primary mirror surface and a secondary mirror surface based on the primary curve and the secondary curve; and
   producing the primary mirror surface and the secondary mirror surface.

10. The two mirror system of claim 9, wherein determining wherein determining the secondary curve from the primary curve is accomplished via application of methods from exterior differential systems.

11. The two mirror system of claim 9, wherein the primary mirror surface is free-form.

12. The two mirror system of claim 9, wherein the secondary mirror surface is free-form.

13. The two mirror system of claim 9, wherein the primary mirror surface and the secondary mirror surface are free-form.

14. A method for producing a multiple mirror system comprising:
   generating a primary curve;
   determining from the primary curve a secondary curve using exterior differential systems;
   progressively determining a primary mirror surface and a secondary mirror surface based on the primary curve and the secondary curve; and
   producing the primary mirror surface and the secondary mirror surface.

15. The method of claim 14, wherein the exterior differential systems is an application of the Cartan-Kahler theorem.

16. The method of claim 14, wherein the primary curve is Kähler regular.

17. The method of claim 14, wherein the primary mirror surface is free-form.

18. The method of claim 14, wherein the secondary mirror surface is free-form.

19. The method of claim 14, wherein the primary mirror surface and the secondary mirror surface are free-form.

* * * * *